(12) United States Patent
Xu et al.

(10) Patent No.: US 10,901,247 B2
(45) Date of Patent: Jan. 26, 2021

(54) OPTICAL FEEDBACK-BASED REPETITIVE FREQUENCY ADJUSTABLE OPTICAL FREQUENCY COMB

(71) Applicant: South China University of Technology, Guangzhou (CN)

(72) Inventors: Shanhui Xu, Guangzhou (CN); Qilai Zhao, Guangzhou (CN); Zhongmin Yang, Guangzhou (CN); Zhouming Feng, Guangzhou (CN); Changsheng Yang, Guangzhou (CN)

(73) Assignee: South China University of Technology, Guangzhou (CN)

( * ) Notice: Subject to any disclaimer, the term of this patent is extended or adjusted under 35 U.S.C. 154(b) by 211 days.

(21) Appl. No.: 16/315,114

(22) PCT Filed: Jan. 1, 2018

(86) PCT No.: PCT/CN2018/070001
§ 371 (c)(1),
(2) Date: Jan. 3, 2019

(87) PCT Pub. No.: WO2018/103765
PCT Pub. Date: Jun. 14, 2018

(65) Prior Publication Data
US 2019/0310498 A1    Oct. 10, 2019

(30) Foreign Application Priority Data

Dec. 5, 2016    (CN) .......................... 2016 1 1103512

(51) Int. Cl.
*G02F 1/11*    (2006.01)
*H01S 3/067*    (2006.01)
(Continued)

(52) U.S. Cl.
CPC .............. *G02F 1/113* (2013.01); *H01S 3/067* (2013.01); *H01S 3/0675* (2013.01);
(Continued)

(58) Field of Classification Search
CPC ... G02F 1/11; G02F 1/116; G02F 1/33; G02F 1/01; G02F 2001/212
(Continued)

(56) References Cited

U.S. PATENT DOCUMENTS

2014/0028997 A1*  1/2014  Cable ................. G01B 9/02067
                                                               356/51

FOREIGN PATENT DOCUMENTS

CN       105529607 A       4/2016
CN       106505403 A       3/2017
(Continued)

*Primary Examiner* — Mohammed A Hasan
(74) *Attorney, Agent, or Firm* — Weisun Rao; Jun Chen; Venture Partner, LLC

(57) ABSTRACT

The present invention provides a repetition frequency-tunable optical frequency comb generated by basis of optical feedback. The optical frequency comb comprises a single-frequency laser resonant cavity, a wavelength division multiplexer, a single-mode semiconductor pump light source, an optical circulator, a first optical fiber coupler, a second optical fiber coupler, a photoelectric detector, a highly-stable signal source, an error signal processing system, a laser frequency modulation device and a tunable laser-delay module. The present invention performs delay-time processing to the single-frequency laser by the tunable laser-delay module, and achieves an optical feedback by the optical circulator for injecting to the resonant cavity, generating a series of tunable laser longitudinal modes with equal frequency space. Meanwhile, in combination with the highly-stable signal source, the error signal processing system and the laser frequency modulation device, a laser frequency lock is achieved, and the laser frequency comb is generated.

(Continued)

The invention obtains a repetition frequency-tunable laser frequency comb with a simple and practical method, having an extensive application prospect and huge application value in fields such as optical fiber sensing and spectroscopy of atom and molecule.

7 Claims, 1 Drawing Sheet

(51) Int. Cl.
    *H01S 3/094*     (2006.01)
    *H01S 3/0933*     (2006.01)
    *H01S 3/11*     (2006.01)
    *H01S 3/091*     (2006.01)

(52) U.S. Cl.
    CPC ........ *H01S 3/06791* (2013.01); *H01S 3/0912* (2013.01); *H01S 3/0933* (2013.01); *H01S 3/094003* (2013.01); *H01S 3/094065* (2013.01); *H01S 3/1106* (2013.01); *G02F 2201/02* (2013.01); *G02F 2201/58* (2013.01); *G02F 2203/25* (2013.01)

(58) Field of Classification Search
    USPC .......................................................... 359/287
    See application file for complete search history.

(56) References Cited

FOREIGN PATENT DOCUMENTS

| | | |
|---|---|---|
| CN | 206272058 U | 6/2017 |
| JP | 2009116242 A | 5/2009 |

\* cited by examiner

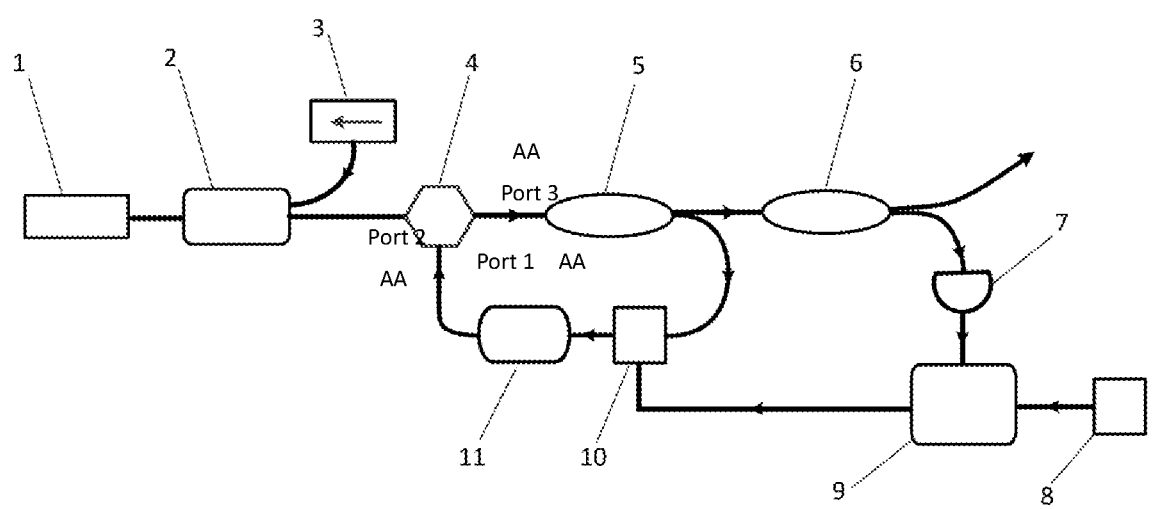

OPTICAL FEEDBACK-BASED REPETITIVE FREQUENCY ADJUSTABLE OPTICAL FREQUENCY COMB

TECHNICAL FIELD

The present invention relates to an optical frequency comb, and particularly relates to a repetition frequency-tunable optical frequency comb generated by basis of optical feedback.

BACKGROUND OF THE PRESENT INVENTION

Optical frequency comb, being a light source which has a comb-like frequency spectrum, possesses significant applications in the related fields such as high-precision frequency standard, precise distance measurement, microwave photonic arbitrary waveform generator, microwave photonic signal processing, dense wavelength division multiplexing, and the like, and the precision of an atomic clock can be enhanced by two orders and above based on an optical clock of the optical comb. In view of its important theoretical significance and application value, the optical comb has become a hotspot studied in the related field.

There are several conventional solutions for generating the optical comb: the first is that using an output in time domain of a mode-locked laser to serve as a periodic pulse train, an optical frequency comb with equal frequency space in frequency domain is obtained by Fourier transformation of the periodic pulse. However, dispersion inside the laser makes a constant difference value between an envelope phase accumulation and a carrier phase accumulation, and thus calibration is needed. Advantages of this solution lie in simple structure and a large number of carriers generated, but defects, such as uneasy control of the number of carriers, poor flatness and uncertain carrier space, still exist. The second is a non-linear optical fiber. This solution obtains an optical frequency comb with wide bandwidth by using the non-linear effects of a highly non-linear optical fiber, such as self-phase modulation and cascade four-wave mixing. The optical frequency comb generated by such method has a relatively large number, but has defects such as poor carrier flatness and uncontrollable number of the carrier. The third is a single/cascade electro-optic modulator. This method is a solution of generating the optical frequency comb which is relatively simpler to achieve with more extensive application. Conventional solutions of the cascade electro-optic modulator include solutions such as an intensity modulator cascading a phase modulator, a polarization modulator cascading a phase modulator, a phase modulator cascading a phase modulator, and a polarization modulator cascading a polarization modulator. The main concept is to vary the performances of outputting the optical frequency comb by controlling parameters such as amplitude of radio source, bias voltage, frequency and the like. This solution possesses advantages such as stable wavelet space, simple generating method and the like, but a high radio frequency drive voltage is needed if a large number of carriers are to be obtained, while the carrier flatness is unsatisfactory.

In addition, the optical frequency comb can also be generated based on the RFS (Recirculating Frequency Shifter) structure. Generating solutions based on the RFS include SSB-RFS (Single Side Band-Recirculating Frequency Shifter), PM-RFS (Phase Modulator-Recirculating Frequency Shifter), MC-RFS (Multichannel-Recirculating Frequency Shifter), PolM-RFS (Polarization Modulator-Recirculating Frequency Shifter) and the like, wherein a basic principle is to increase the generated number of carriers by using recirculating frequency shifting. This method possesses advantages like a relatively large number of the generated optical frequency combs and good flatness, but such method possesses disadvantages such as unapparent carrier phase relationships, strong carrier noise and the like.

However, generating optical frequency comb based on an optical feedback mechanism may effectively suppress the problem of strong carrier noise, and meanwhile may allow to generate a relatively large number of optical frequency combs, to vary a delay time in an optical feedback device and to obtain the optical frequency combs with different frequencies.

SUMMARY OF THE INVENTION

The objectives of the present invention is to overcome the deficiencies in the prior art and to provide a repetition frequency-tunable optical frequency comb generated by basis of optical feedback. Through the combination of a laser optical feedback device and a frequency-locking effect, a repetition frequency-tunable laser frequency comb is thus generated.

The objectives of the present invention are achieved by the following technical solutions.

A repetition frequency-tunable optical frequency comb generated by basis of optical feedback, comprises a single-frequency laser resonant cavity, a wavelength division multiplexer, a single-mode semiconductor pump light source, an optical circulator, a first optical fiber coupler, a second optical fiber coupler, a photoelectric detector, a highly-stable signal source, an error signal processing system, a laser frequency modulation device and a tunable laser-delay module; structural relationships between each components are as follows: the single-frequency laser resonant cavity being connected with a common port of the wavelength division multiplexer, a pump port of the wavelength division multiplexer being connected with the single-mode semiconductor pump light source, a signal port of the wavelength division multiplexer being connected with a port 2 of the optical circulator, an input port of the first optical fiber coupler being connected with a port 3 of the optical circulator, one output port of the first optical fiber coupler being connected with an input port of the second optical fiber coupler, an input port of the laser frequency modulation device being connected with the other output port of the first optical fiber coupler, the tunable laser-delay module being respectively connected with an output port of the laser frequency modulation device and a port 1 of the optical circulator, one output port of the second optical fiber coupler serving as an output of the optical frequency comb, an input port of the photoelectric detector being connected with the other output port of the second optical fiber coupler, the highly-stable signal source and an output port of photoelectric detector being simultaneously connected with the error signal processing system, and an output port of the error signal processing system being connected with a control port of the laser frequency modulation device.

Further, the repetition frequency is less than 10 MHz.

Further, an output of the single-frequency laser resonant cavity is a single-frequency laser which is output with any wavelength, continuous single frequency and tunable frequency.

Further, the highly-stable signal source comprises but not limited to a crystal oscillator, a signal generator, an atomic clock and the like.

Further, the laser frequency modulation device comprises but not limited to an optical fiber stretcher, an acoustic optical modulator, an electro-optic modulator and the like.

Further, the tunable laser-delay module comprises but not limited to an optical fiber delay line, a high-reflectivity laser cavity and the like.

Further, after an output laser of the single-frequency laser resonant cavity goes through the tunable laser-delay module, an optical feedback is achieved through the optical circulator and the output laser is injected to the single-frequency laser resonant cavity, to generate a series of laser longitudinal modes with equal frequency space. Meanwhile in combination with the highly-stable signal source, the error signal processing system and the laser frequency modulation device, a laser frequency lock is achieved, and a laser frequency comb is generated.

Compared with the prior art, the present invention has following advantages and technical effects:

A pump light output by the single-mode semiconductor pump light source pumps the single-frequency optical fiber laser resonant cavity through the wavelength division multiplexer, and after a laser signal which is output from the optical fiber resonant cavity through the wavelength division multiplexer goes through the optical circulator, the laser signal enters the first optical fiber coupler to achieve laser beam splitting. A part of the light, through the laser frequency modulation device and the tunable laser-delay module, enters the optical circulator for being injected in the single-frequency optical fiber laser resonant cavity again to achieve an optical feedback, while another part of the light enters the other second optical fiber coupler, and part of the light which is output from the second optical fiber coupler enters the photoelectric detector for being converted into an electrical signal. Such electrical signal carries information of amplitude and frequency fluctuations of the laser. After the electrical signal and a signal of the highly-stable signal source are operated and processed by the error signal processing system, they are loaded on the laser frequency modulation device to achieve laser frequency lock, and a laser frequency comb is generated. Compared with the conventional solution of generating an optical frequency comb based on a mode-locked laser or an optical microcavity, the present invention combines the optical feedback and the frequency lock, and provides an effective solution which is simpler with tunable frequency space.

BRIEF DESCRIPTION OF THE DRAWINGS

FIG. 1 shows a schematic diagram of a repetition frequency-tunable optical frequency comb generated by basis of optical feedback in the embodiment of the present invention.

Wherein, 1-single-frequency laser resonant cavity, 2-wavelength division multiplexer, 3-single-mode semiconductor pump light source, 4-optical circulator, 5-first optical fiber coupler, 6-second optical fiber coupler, 7-photoelectric detector, 8-highly-stable signal source, 9-error signal processing system, 10-laser frequency modulation device, 11-tunable laser-delay module.

DETAILED DESCRIPTION OF THE PREFERRED EMBODIMENT

Specific implementations of the present invention are further described by the combination of accompanied drawing and specific embodiment below. It should be illustrated that the scope of protection claimed by the invention is not limited to the scope described by the embodiment, and meanwhile those which are not described in detail below can be achieved by the skilled person in the art with reference to the prior art.

Embodiment 1

In the present embodiment, a 980 nm single-mode semiconductor laser serving as a single-mode semiconductor pump light source 3, backward pump performed on a single-frequency laser resonant cavity 1 was achieved through a 980/1550 nm polarization-maintaining wavelength division multiplexer 2. The single-frequency laser resonant cavity 1 was a single-frequency optical fiber DBR (Distributed Bragg Reflector) resonant cavity having an output laser wavelength of 1550.52 nm. After going through a 1550 nm polarization-maintaining optical fiber circulator 4, the output laser entered a first optical fiber coupler 5 having a splitting ratio of 50:50. A highly-stable signal source 8 in the embodiment was a highly-stable temperature-compensation crystal oscillator having a frequency of 50 MHz, a laser frequency modulation device 10 was an acoustic optical modulator, and a tunable laser-delay module 11 was an optical fiber delay line in 1 km length. A part of the light which was output from the first optical fiber coupler 5 was connected to a second optical fiber coupler 6 having a splitting ratio of 10:90, wherein 10% of the light entered a photoelectric detector 7 and 90% of the ports served as an output port of the optical frequency comb. An electrical signal obtained by the photoelectric detector and a standard signal of 50 MHz of the temperature-compensation crystal oscillator simultaneously entered an error signal processing system 9, which can employ a signal processing system in the prior art. The error signal processing system 9 performed band-pass filtering to the electrical signal detected by the photoelectric detector to obtain a comb signal near 50 MHz, and meanwhile performed band-pass filtering to the signal of the temperature-compensation crystal oscillator to eliminate harmonic signals of other frequency components. Then these two signals were effectively amplified and entered a frequency mixer for frequency mixing, and a low-frequency error signal was obtained by adding a low-pass filter. Such low-frequency error signal carried not only frequency fluctuation information of the optical frequency comb, but also amplitude fluctuation information. By PID (Proportion Integration Differentiation) operating and processing of the error signal, an obtained signal was loaded to a laser frequency modulation device 10. After achieving frequency lock, a laser frequency comb with stable frequency was output. Compared with the conventional solution of generating an optical frequency comb based on a mode-locked laser or an optical microcavity, the present invention combines the optical feedback and the frequency lock, and provides an effective solution which is simpler with tunable frequency space.

What is claimed:

1. A repetition frequency-tunable optical frequency comb generated by basis of optical feedback, characterized in that, the repetition frequency-tunable optical frequency comb comprises a single-frequency laser resonant cavity (1), a wavelength division multiplexer (2), a single-mode semiconductor pump light source (3), an optical circulator (4), a first optical fiber coupler (5), a second optical fiber coupler (6), a photoelectric detector (7), a highly-stable signal source (8), an error signal processing system (9), a laser frequency modulation device (10) and a tunable laser-delay module (11); structural relationships between each components are as follows: the single-frequency laser resonant cavity (1) being connected with a common port of the wavelength division multiplexer (2), a pump port of the wavelength division multiplexer (2) being connected with the single-mode semiconductor pump light source (3), a signal port of the wavelength division multiplexer (2) being connected with a port 2 of the optical circulator (4), an input port of the first optical fiber coupler (5) being connected with a port 3 of the optical circulator (4), one output port of the first optical fiber coupler (5) being connected with an input port of the second optical fiber coupler (6), an input port of the laser frequency modulation device (10) being connected with the other output port of the first optical fiber coupler (5), the tunable laser-delay module (11) being respectively connected with an output port of the laser frequency modulation device (10) and a port 1 of the optical circulator (4), one output port of the second optical fiber coupler (6) serving as an output of the optical frequency comb, an input port of the photoelectric detector (7) being connected with the other output port of the second optical fiber coupler (6), the highly-stable signal source (8) and an output port of photoelectric detector (7) being simultaneously connected with the error signal processing system (9), and an output port of the error signal processing system (9) being connected with a control port of the laser frequency modulation device (10).

2. The repetition frequency-tunable optical frequency comb generated by basis of optical feedback according to claim 1, wherein the repetition frequency is less than 10 MHz.

3. The repetition frequency-tunable optical frequency comb generated by basis of optical feedback according to claim 1, wherein an output of the single-frequency laser resonant cavity (1) is a single-frequency laser which is output with any wavelength, continuous single frequency and tunable frequency.

4. The repetition frequency-tunable optical frequency comb generated by basis of optical feedback according to claim 1, wherein the highly-stable signal source (8) comprises a crystal oscillator, a signal generator or an atomic clock.

5. The repetition frequency-tunable optical frequency comb generated by basis of optical feedback according to claim 1, wherein the laser frequency modulation device (10) comprises an optical fiber stretcher, an acoustic optical modulator, an electro-optic modulator or a magneto-optic modulator.

6. The repetition frequency-tunable optical frequency comb generated by basis of optical feedback according to claim 1, wherein the tunable laser-delay module (11) comprises an optical fiber delay line or a high-reflectivity laser cavity.

7. The repetition frequency-tunable optical frequency comb generated by basis of optical feedback according to claim 1, wherein after an output laser of the single-frequency laser resonant cavity (1) goes through the tunable laser-delay module (11), an optical feedback is achieved through the optical circulator (4) and the output laser is injected to the single-frequency laser resonant cavity (1), to generate a laser longitudinal mode with equal frequency space; and meanwhile in combination with the highly-stable signal source (8), the error signal processing system (9) and the laser frequency modulation device (10), a laser frequency lock is achieved, and a laser frequency comb is generated.

\* \* \* \* \*